United States Patent Office 2,844,641
Patented July 22, 1958

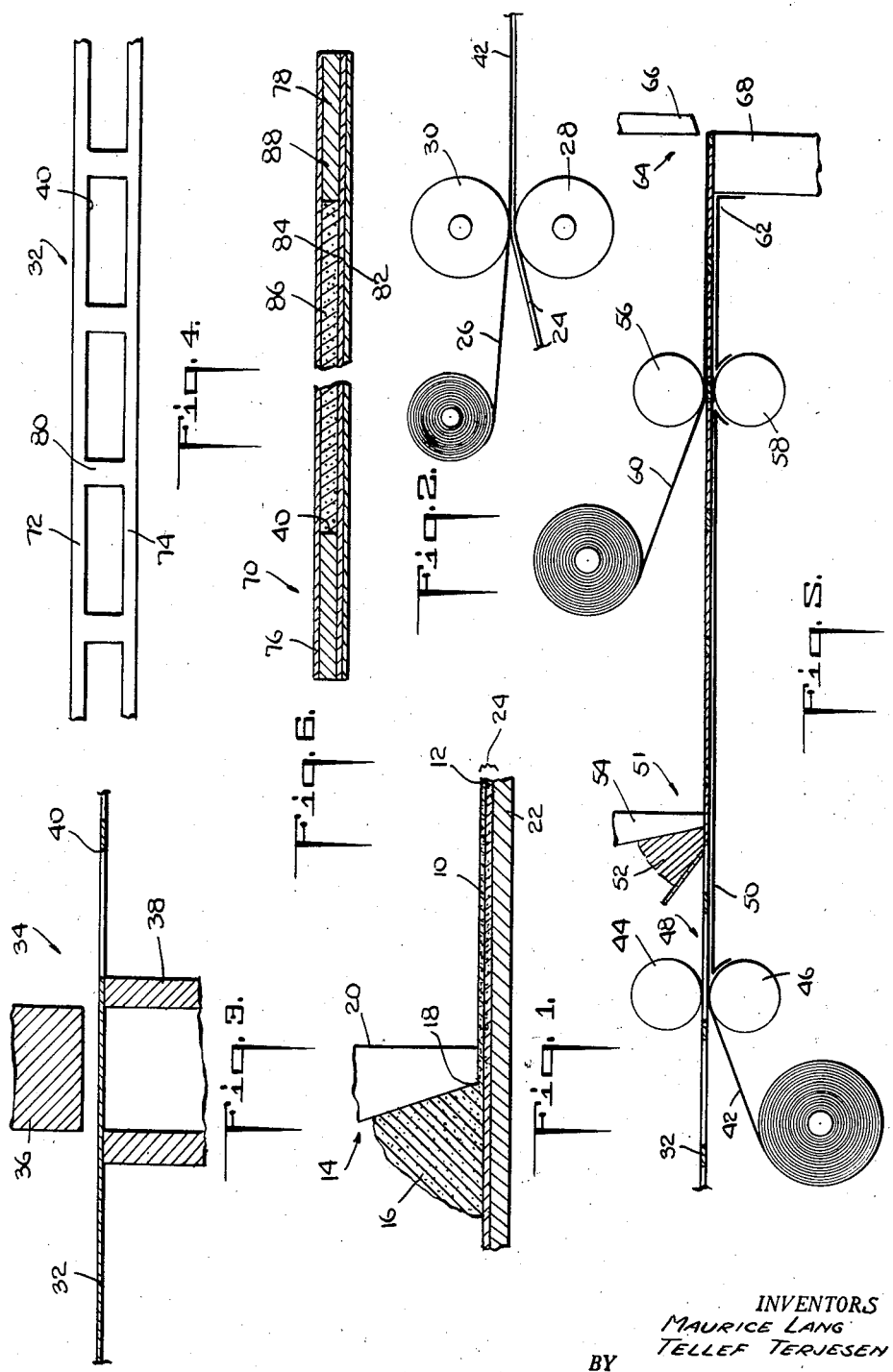

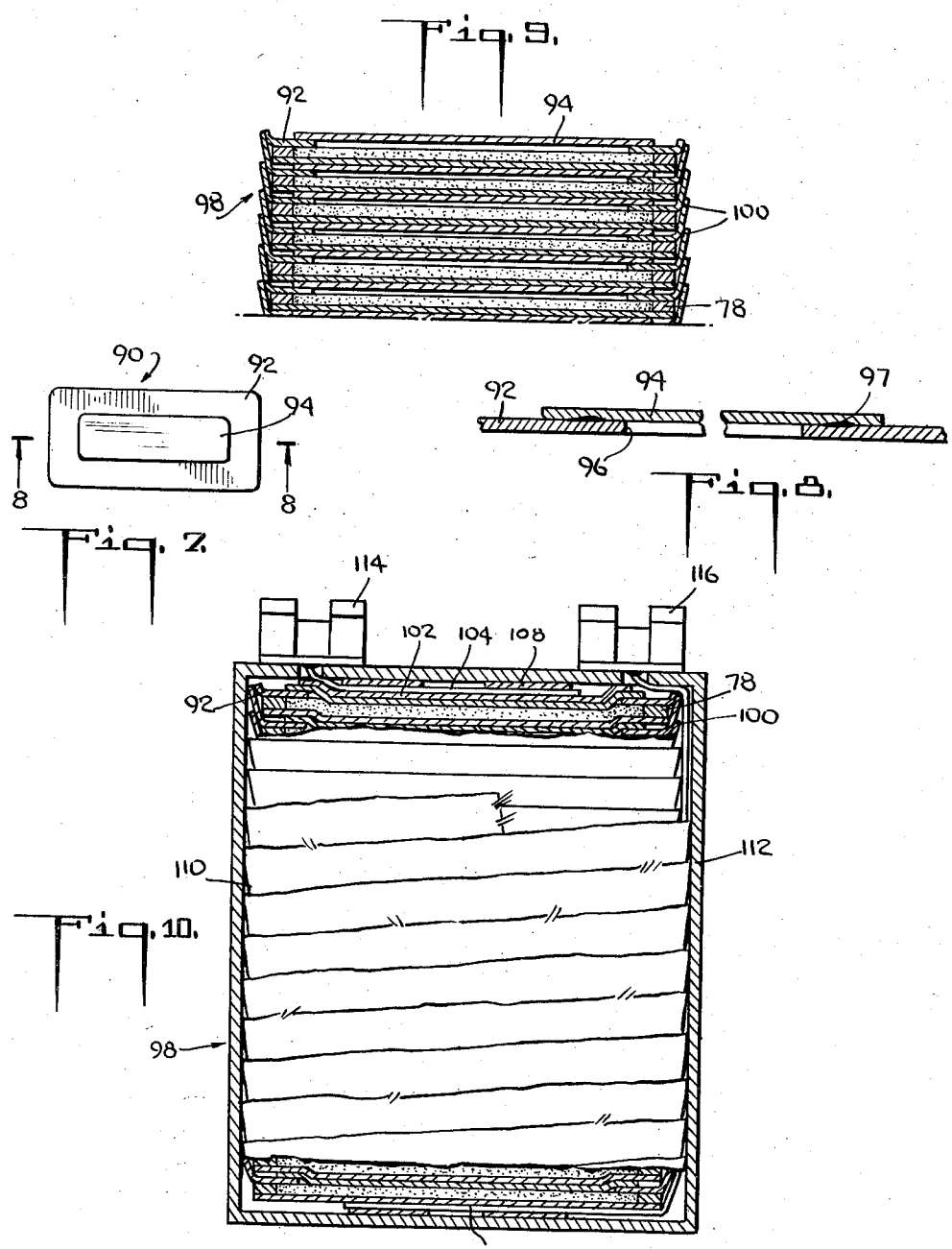

2,844,641

WAFER-TYPE CELLS FOR DRY BATTERIES AND METHOD FOR MAKING SAME

Maurice Lang, Long Beach, and Tellef A. Terjesen, Bronx, N. Y., assignors to United States Electric Mfg. Corporation, New York, N. Y., a corporation of New York Application October 12, 1954, Serial No. 461,733

4 Claims. (Cl. 136—111)

This invention relates to wafer-type cells for dry batteries and to a method for making the same.

By the term "wafer-type cell" there is denoted a light weight very thin cell, i. e., a cell whose height is in the neighborhood of from about 0.025 inch to about 0.050 inch. The diameter of such a cell usually is about 1½ inches, although this dimension is not important. These cells are employed where high voltages or high current drains or a combination of the two are needed momentarily, that is to say, for up to a few minutes.

Through the use of wafer cells a primary battery with a large number of cells will occupy a comparatively small space and have a comparatively slight weight, it being appreciated that with the minimum thickness mentioned, 40 cells stacked in series with an overall height of an inch will yield about 60 volts.

By way of comparison, a conventional flashlight cell is about 2¼ inches high. A conventional flat-type plate battery cell has a thickness varying from ⅛ to ¼ of an inch. A wafer-type cell is only about ¹⁄₄₀ of an inch thick, this being a new and lower order of magnitude.

Up to the present time, no satisfactory wafer-type cell has been mass-produced or even proposed to be made at a price which is comparable to that of a plate-type battery cell. Moreover, wafer-type cells have heretofore deteriorated quickly.

It is an object of our invention to provide a wafer-type cell and method for making the same which is subject to neither of the foregoing disadvantages.

More specifically, it is an object of our invention to provide a wafer-type cell which can be made inexpensively and reliably in a mass production operation.

It is another object of our invention to provide a wafer-type cell of rugged construction which has a comparatively long shelf life.

It is an additional object of our invention to provide a wafer-type cell which can be produced at high speeds.

It is still another object of our invention to provide a wafer-type cell which lends itself to production methods that do not require the use of many skilled workers.

It is another object of our invention to provide a method for making wafer-type cells which can be practiced on a mass production basis and carried out with speed and accuracy.

Other objects of our invention in part will be obvious and in part will be pointed out hereinafter.

Our invention accordingly consists in the features of construction, combinations of elements, arrangements of parts and series of steps which will be exemplified in a battery and method hereinafter described and of which the scope of application will be indicated in the appended claims.

In the accompanying drawings in which is shown one of the various possible embodiments of our invention, Fig. 1 is a sectional view through an apparatus for carrying out the first step in the preparation of a wafer cell, to wit, coating a bibulous strip with an electrolyte gel;

Fig. 2 is a sectional view through an apparatus for carrying out the second step in the preparation of said cell, to wit, duplexing the coated bibulous strip to a zinc sheet;

Fig. 3 is a sectional view through an apparatus for carrying out the third step in the aforesaid preparation, to wit, perforating a plastic web;

Fig. 4 is a plan view of said web after perforation;

Fig. 5 is a sectional view through an apparatus for carrying out the fourth step in said preparation, to wit, integrating the duplexed stock with a depolarizing mix and a protective film and thereafter separating individual cell elements;

Fig. 6 is an enlarged vertical sectional view through a cell element prepared in the apparatus of Fig. 5;

Fig. 7 is a top plan view of the flexible carbon electrode employed in the cell;

Fig. 8 is a sectional view taken substantially along the line 8—8 of Fig. 7;

Fig. 9 is a vertical sectional view through a set of wafer cells arranged in a stack preparatory to forming a battery therefrom; and Fig. 10 is a vertical sectional view through the finished battery.

Referring now in detail to the drawings and more particularly to Fig. 1, the first step in the preparation of a wafer-type cell embodying my invention constitutes applying an electrolyte gel as a coating 10 to a bibulous strip 12 which is chemically and physically inert to the ingredients present in the cell. A paper which I have found to be satisfactory is a very thin, e. g. 0.001 or 0.002 inch, unsized sulfite, this being a highly absorbent paper.

The coating can be applied in any well-known fashion. Conveniently, it may be deposited by a hopper 14 containing a mass 16 of electrolyte gel in sufficiently fluid form to pass through the hopper throat 18, the thickness of the coating being regulated by the height of a doctor blade 20 above the paper and the speed of travel of the paper strip 12. Said strip is moved to, under and past the doctor blade on a conveyor belt 22. If it is desired to flow a gel in a somewhat viscous state, it can be maintained in the hopper under pressure.

Satisfactory gel compositions are conventional. A typical composition includes zinc chloride, ammonium chloride, a gelling agent such as starch or flour, and water. We prefer to employ as little water as possible. However, when the coated strip is used in the second step of our process, it is preferable to have the layer of electrolyte gel damp enough for it to be tacky and thus ready to adhere to a metal surface. It is also desirable to have water in the electrolyte gel in order to encourage penetration of the gel into the paper strip and into the mix cake hereinafter described in order thereby to complete the circuit between the two electrodes of the cell.

It will be understood that although we have illustrated and described in some detail a particular method for coating the paper strip with an electrolyte gel, we do not wish to be limited thereto and may employ other known coating procedures for this purpose, as for instance dipping, brushing, spraying or rolling.

The coated paper strip 24 is secured, i. e., duplexed, to a thin zinc sheet 26, the coated side of the strip facing the zinc sheet whereby the tacky properties of the electrolyte gel will cause adherence between these two thin flat members. Desirably the duplexing is carried out continuously by passing the strip 24 and sheet 26 between a pair of pressure rolls 28, 30. The zinc sheet can be unwound from a supply roll and the coated strip fed directly from the coating apparatus after partial drying, if necessary, in a baking oven.

Alternatively, the duplexing can be effected by laying the coated strip on the zinc sheet and optionally thereafter pressing the two sheets together either manually, or with a hand roller, or with a press.

To form the mix cake in situ, pursuant to the present invention we provide a spacer web 32 fabricated from an impermeable material which is inert to the ingredients present in the cell. A typical satisfactory material is a plastic and preferably a thermoplastic in sheet form. One thermoplastic which has proven satisfactory is a pellicle of polymerized vinyl chloride. It may be mentioned that less flexible plastics can be employed.

The web 32 is passed through a pair of perforating dies 34 including a punch 36 and a hollow anvil 38. The feed of the web is intermittent to permit operation of the punch as is conventional. The dies form a series of through openings 40 of the size and shape of the mix cake to be used in a unit cell. The thickness of the web is equal to the thickness of the mix cake, a typical thickness being 0.015 inch.

It may be mentioned that, if desired, instead of forming a single large opening 40 we may provide a plurality of side by side smaller openings arranged in a pattern covering the same plan configuration as the larger opening. Such a group of small openings constitutes a grid providing, in effect, the desired large opening.

The duplex stock 42 is assembled with the perforated web 32, as by passing these two sheets between a pair of pressure rolls 44, 46 whereby the web is juxtaposed on the composite stock as illustrated at the point 48 in Figure 5.

The integrated sheets are supported by a platform 50. As the sheets are drawn along the platform they are passed, with the perforated web uppermost, beneath a mechanism 51 for depositing depolarizing mix 52 in the apertures 40. Conveniently said mechanism constitutes a hopper containing a mass of depolarizing mix controlled by a doctor blade 54.

The depolarizing mix conventionally includes a predominant portion of manganese dioxide to act as the depolarizer, some ammonium chloride and zinc chloride which with water function as an electrolyte that permeates the mass, and a small proportion of an electric conductor, as for example, carbon black or graphite. A typical amount of water is 20% by weight of the depolarizing mix which renders the mass plastic and therefore usable in a hopper.

As the two integrated sheets, i. e., the perforated web and the composite stock pass beneath the hopper 51 and more particularly beneath the doctor blade, the depolarizing mix is forced into the openings 40. The doctor blade lightly rests against the upper surface of the perforated web and therefore scrapes, i. e., wipes off all the mix except that located in the opening.

The integrated stock which now contains the depolarizing mix is drawn along the platform 50 by a pair of pressure feed rolls 56, 58. A film 60, as for example, a thin inexpensive paper web is introduced between these rolls. Upon passage through the rolls 56, 58 the paper web is adhered lightly to the integrated stock and forms a protective film overlying the openings. The purpose of this film soon will be apparent.

The integrated layers and protective film are discharged from the rolls 56, 58 to a second platform 62 that terminates at a cutting mechanism 64 including a shear blade 66 and a stationary bed 68.

Both pairs of rolls 44, 46 and 56, 58 are intermittently driven. The cutting mechanism is controlled to operate during the idle period of no feed and thereby cut from the combined integrated layers and protective film a zinc-mix cell element 70. It will of course be understood that any other type of conventional separating, severing or shearing mechanism can be employed in lieu of the one just described, as for example, a flying shear which during its operation moves along with and at the same speed as the integrated layers thereby permitting the rolls 44, 46, 56, 58 to be operated continuously.

The cutting mechanism is timed and arranged to sever the integrated layers and protective film mid-way between the openings 40 so that each zinc-mix cell element 70 includes one entire opening surrounded by retaining walls that are formed from the material of the web 32. More specifically, these walls include side walls 72, 74 which initially lay alongside the openings 40 while the latter still were present in the web. The walls also include end walls 76, 78 each of which comprises one-half of a portion 80 which separated the openings while still in the web.

The materials employed for the blades of the cutting mechanism are particularly susceptible to chemical attack by the compositions present in the depolarizing mix. We have found that these materials are protected from such attack by film 60. Said film is stripped from the zinc-mix cell element 70 subsequent to the formation of the latter.

A cell element 70 includes a thin flat zinc electrode disc 82, e. g. about 0.005 inch thick, which previously was part of the zinc sheet 26, an electrolyte-impregnated paper wafer 84, e. g. about 0.003 inch thick, which previously was part of the paper strip 12, a thin disc 86 of depolarizing mix which constitutes the mix cake, and a retainer ring 88 which previously was part of the perforated web 32.

It will be appreciated that the foregoing method of forming the mix cake in situ with what is, in effect, an open mold accurately locates the cake on the zinc electrode, insures a proper amount of depolarizer and prevents contamination of any of the other parts of the cell. Moreover, due to the pressure exerted on the depolarizing mix during passage under the doctor blade a good electrical and mechanical bond is created between the mix cake and the electrolyte soaked paper, thereby further reducing the internal resistance of the cell and enabling the zinc electrode and mix cake to be handled without fear of breaking the otherwise fragile cake.

Each cell includes a flexible carbon electrode 90. Said electrode comprises a flexible carrier 92 and a flexible carbonaceous sheet 94. Preferably the carrier 92 is thermoplastic and thereby autogenously weldable to a sheet of compatible material under the influence of heat and pressure. Said carrier is fabricated from sheet material, a suitable substance being a polyvinyl chloride. The shape of the carrier conveniently may be substantially the same in plan contour as that of the external contour of the zinc electrode disc and the retainer ring, these being identical. However, the periphery of the carrier is larger than that of a zinc-mix cell element 70 so that when laid down on an element the carrer will extend beyond the borders thereof. Said carrier is provided with a large central opening 96 which may have the same shape as the mix cake 86 but is slightly smaller.

The flexible carbonaceous sheet 94 preferably is made in accordance with my U. S. Letters Patent No. 2,664,453 for batteries, dated December 29, 1953 and owned by the assignee of the present application.

Essentially, said sheet is flexible and water impermeable and includes a coherent sheet of a fibrous liquid permeable materal such as cloth or unglazed paper impregnated from face to face with an imperforate coherent layer of a thermoplastic carrier, e. g. polymerized vinyl chloride, which is coextensive with the sheet and fills the interstices thereof. The polyvinyl chloride has carbonaceous particles basically of a graphitic nature, for example graphite or carbon black, uniformly and heavily distributed therethrough, the particles being present preferably in an amount by weight equal to the amount of thermoplastic material so that the impregnated sheet has a low electrical resistance.

The flexible carbonaceous sheet 94 is disposed on the flexible carrier 92 over the central opening 96 and is sufficiently large to completely cover the same. The sheet 94 and carrier 92 are joined permanently to one another around the central opening by a water-tight seal 97. This can be accomplished suitably by autogeneously welding the sheet and carrier to one another under heat and pressure.

A single unit cell comprises a zinc-mix cell element 70, essentially consisting of a zinc electrode disc and a mix cake held spaced from one another by the electrolytic wafer 84, with a flexible carbon electrode 90 overlying said cell element. A battery 98 comprises a stack of such unit cells, that is to say, a series of cell elements between which flexible carbon electrodes are interleaved. Due to the dimensions of the flexible carriers 92 the peripheries thereof extend well beyond the cell elements 70 in the stack. The extending portions of adjacent flexible carriers are sealed to one another, as at 100, in a water-tight manner, e. g. by autogenous welding. Thus each cell element 70 containing a mix cake, separator and zinc electrode is isolated from adjacent cell elements, the only connection being through the juxtaposed carbon electrodes.

A typical battery, after sealing of the carriers, has the appearance shown in Fig. 9. Desirably during the aforementioned sealing the extending portions of the carriers are folded to lie against the stack of zinc-mix cell elements.

In a finished battery (see Fig. 10) a zinc plate 102 is placed on top of the uppermost carbon electrode and a wire 104 is soldered to it. Another wire 106 is soldered to the lowermost zinc disc. The stack of cells is compressed and is held under pressure by vertically encircling tapes 108. The sides of the stack are reinforced by a horizontally encircling tape 110 which after wrapping may be dipped in wax. The wrapped stack is enclosed in a water-proof paper container 112. Terminals 114, 116 are applied to the free ends of the wires 104, 106.

It thus will be seen that we have provided a wafer-type cell for dry batteries nad a method for making the same which achieve the various objects of our invention and are well adapted to meet the conditions of practical use.

As various embodiments might be made of our invention and as various changes might be made in the embodiment above set forth, it is to be understood that all matter herein described or shown in the accompanying drawings is to be interpreted as illustrative and not in a limiting sense.

Having thus described our invention, we claim as new and desire to secure by Letters Patent:

1. In a method of making a wafer-type cell wherein a paper lining is applied to a zinc sheet electrode, wherein an electrically non-conductive sheet having an aperture is applied to the lining, wherein the aperture is filled with a depolarizing material, and wherein the depolarizing material is covered with a carbon sheet electrode, that improvement including: the steps of duplexing a paper lining sheet on a zinc sheet, superposing on the paper lining sheet a flexible electrically non-conductive sheet having a series of through openings aligned with the longitudinal axis of the sheet, continuously applying a depolarizing material in plastic form to the sheet so as to fill the openings, removing the depolarizing material on the sheet outside of the openings, applying a protective web to the sheet on the surface thereof over the openings, then cutting through the protective web, the sheet and the strip around each opening to form a cell element and, finally, removing the protective web from the cell element.

2. In a method of making a wafer-type cell wherein a paper lining is applied to a zinc sheet electrode, wherein an electrically non-conductive sheet having an aperture is applied to the lining, wherein the aperture is filled with a depolarizing material, and wherein the depolarizing material is covered with a carbon sheet electrode, that improvement including: the steps of duplexing a paper lining sheet on a zinc sheet, superposing on the paper lining sheet a flexible electrically non-conductive sheet having a series of through openings aligned with the longitudinal axis of the sheet and continuously applying a depolarizing material in plastic form to the sheet so as to fill the openings.

3. In a method of making a wafer-type cell, wherein a paper lining is applied to a zinc sheet electrode, wherein an electrically non-conductive sheet having an aperture is applied to the lining, wherein the aperture is filled with a depolarizing material, and wherein the depolarizing material is covered with a carbon sheet electrode, that improvement including: the steps of duplexing a paper lining panel on a zinc panel, superposing on the paper lining panel a flexible electrically non-conductive panel having a through opening therein, applying a depolarizing material in plastic form to fill said opening, applying a protective web to the last named panel on the surface thereof over the opening, then cutting through the protective web and the three panels around the opening to form a cell element and finally removing the protective web from the cell element.

4. For use in the manufacture of a wafer-type Leclanche cell, a step product constituting a duplexed strip including an elongated zinc sheet and a paper lining sheet, said product further comprising a flexible electrically non-conductive sheet disposed on the paper lining, said sheet having a series of through openings aligned with the longitudinal axis of the sheet, a depolarizing mix in said openings and a protective web overlying the non-conductive sheet and the openings therein.

References Cited in the file of this patent

UNITED STATES PATENTS

| | | |
|---|---|---|
| 2,527,576 | Ruben | Oct. 31, 1950 |
| 2,593,893 | King | Apr. 22, 1952 |
| 2,635,128 | Arbogast | Apr. 14, 1953 |
| 2,650,945 | Herbert | Sept. 1, 1953 |
| 2,664,453 | Lang | Dec. 29, 1953 |
| 2,666,802 | Woodring et al. | Jan. 19, 1954 |

FOREIGN PATENTS

| | | |
|---|---|---|
| 506,138 | Belgium | Oct. 15, 1951 |